United States Patent [19]

Shikata

[11] Patent Number: 4,507,023
[45] Date of Patent: Mar. 26, 1985

[54] CUTTING TOOL
[75] Inventor: Hiroshi Shikata, Yokohama, Japan
[73] Assignee: Tokyo Shibaura Denki Kabushiki Kaisha, Kawasaki, Japan
[21] Appl. No.: 368,438
[22] Filed: Apr. 14, 1982
[30] Foreign Application Priority Data May 30, 1981 [JP] Japan .................................. 56-83482
Aug. 26, 1981 [JP] Japan ........................... 56-125197[U]

[51] Int. Cl.$^3$ .............................................. B26D 1/00
[52] U.S. Cl. ................................. 407/103; 407/105; 407/114
[58] Field of Search ............... 407/103, 104, 105, 114, 407/115, 116

[56]            References Cited
         U.S. PATENT DOCUMENTS 3,289,272 12/1966 Stier ..................................... 407/104
3,540,102 11/1970 Yogus et al. ......................... 407/104
3,925,868 12/1975 Singh .................................... 407/104

FOREIGN PATENT DOCUMENTS 2726802 6/1977 Fed. Rep. of Germany ...... 407/105

Primary Examiner—W. D. Bray
Attorney, Agent, or Firm—Oblon, Fisher, Spivak, McClelland & Maier

[57]                ABSTRACT

A cutting tool comprises a bit-holder fed at a prescribed feed amount f per rotation of the workpiece, and a throw-away tip which is formed of superhard metal, which has an outer peripheral surface of prescribed shape, an inner peripheral surface provided concentrically with the outer peripheral surface, similar to the prescribed shape of the outer peripheral surface and defining a hollow part and a predetermined thickness t and which is detachably mounted to the bit-holder. A distance $\omega$ between the inner peripheral surface of the throw-away tip and the outer peripheral surface thereof is defined within a range satisfying the following formula represented by; $f_{max} \leq \omega \leq t$.

18 Claims, 47 Drawing Figures

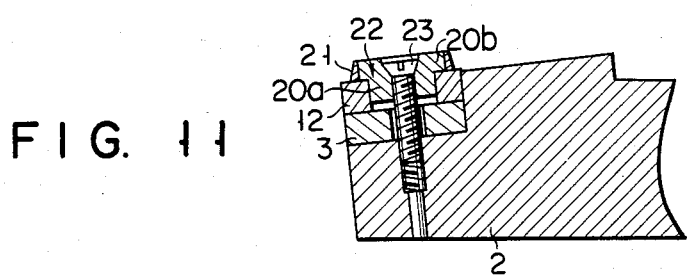
FIG. 11
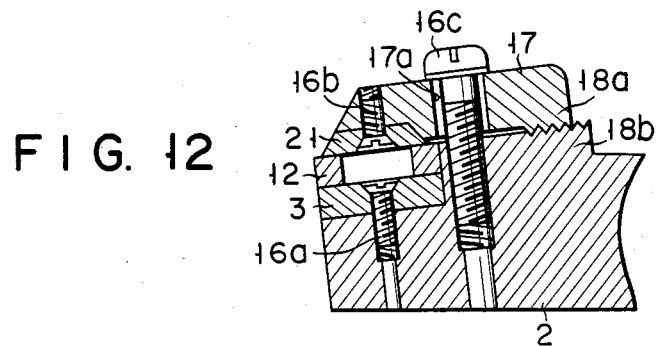
FIG. 12
FIG. 13A   FIG. 13B   FIG. 13C
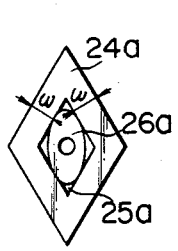 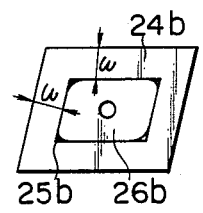 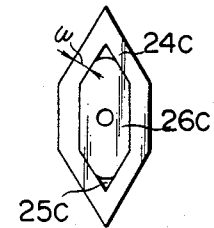
FIG. 13D   FIG. 13E
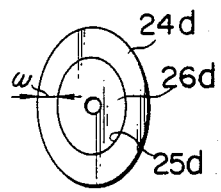 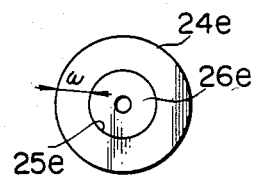

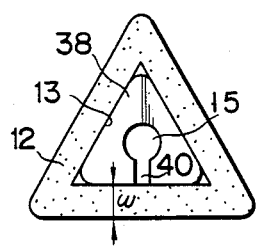
FIG. 20
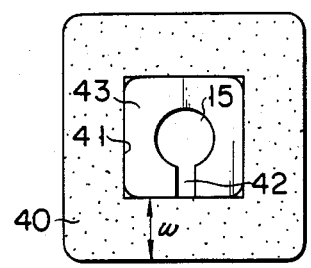
FIG. 21
FIG. 22
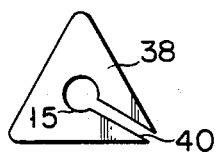
FIG. 23
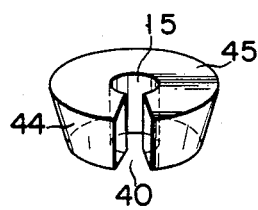
FIG. 24
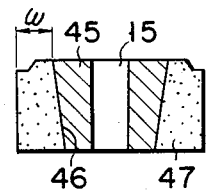
FIG. 25
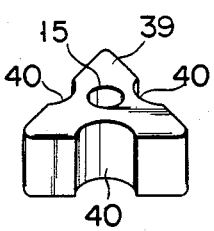

CUTTING TOOL

BACKGROUND OF THE INVENTION

The present invention relates to a cutting tool having a throw-away tip and, more particularly, to a resource-saving type cutting tool.

A throw-away tip to function as a cutting edge of a bit tool generally has a variety of merits, e.g., a lower cost per a cutting edge than a resharpening type brazed tip, less handling time for replacing a worn tip with a new tip, reproducibility in the positional relationship between a bit-holder after replacement and a new tip to be similarly retained to the state before the replacement, and has hence a wide application in an industrial field. Since the throw-away tip is, however, formed of expensive materials such as, tungsten, cobalt, etc., it has a disadvantage of expensive cost.

FIG. 1A is a perspective view showing a conventional throw-away tip integral with a bit-holder. As shown in FIG. 1A, a throw-away tip 1 has a through hole 5 to be engaged with a tip locking pin 4 tiltably mounted with a shim 3 of a bit-holder 2. This pin 4 is, as shown in FIG. 2, inclined toward the wall surface 7 at the tip seat side of the bit-holder 2 by rotating and implanting a clamping screw 6. When this tip 1 is attached to the bit-holder 2, the tip locking pin 4 is inserted into the mounting hole 5 to arrange the tip 1 on the shim 3, and the clamping screw 6 is turned and implanted. The locking pin 4 is inclined by this turning toward the wall surface 7, the tip 1 is urged onto the wall surface 7, and is locked onto the bit-holder 2. The throw-away tip 1 thus mounted at the bit-holder 2 is contacted with a workpiece to cut the same. In ordinary cutting work, a relief face wear 8a and a rake face wear 8b will respectively occur on a relief face 1a and a rake face 1b both forming a cutting edge of the tip 1, as shown in FIGS. 1A and 1B. The width $V_B$ of the relief face wear 8a which relates directly to the dimensional accuracy of the workpiece and the roughness of the finished surface of the workpiece is normally less than 0.5 mm, and a relatively small amount of wear of the cutting edge takes place at the extremely restricted parts.

In cutting theory, in case, for example, of an ordinary three-dimensional cutting, as shown in FIG. 3, of a cylindrical workpiece 9, a cutting resistance force P0 can be divided into a main component P1 of force, a feeding component P2 of force and a back component P3 of force. The magnitudes of the respective components of force normally depend on the material of the workpiece 9, the shapes of the tip 1 and the bit-holder 2, the cutting conditions, etc. and the main component P1 of force is commonly prominent. It is appreciated from this that the size and hence the width of the tip 1 along a direction of the feeding component P2 of force is not so necessarily required as the size and hence the thickness of the tip 1 along a direction of the main component P1. However, in the conventional tip 1, the width of the tip 1 is normally larger than the thickness of the tip due to the feasibility of locking to the bit-holder 2 and to the interchangeability of the tip. As described above, an effort to positively reduce the capacity of the tip rationally as much as possible to save resources is not carried out in the conventional throw-away tip by considering the wearing state and the cutting resistance.

SUMMARY OF THE INVENTION

It is an object of the present invention to provide a cutting tool which is capable of eliminating the aforementioned drawbacks and disadvantages of the conventional cutting tool and which comprises a resource-saving type throw-away tip which is inexpensive and interchangeable with the conventional tip without reducing the strength and the cutting performance by considering the wear occurring positions, wearing extent, the magnitude and the direction of the cutting resistance.

According to an aspect of the present invention, there is provided a cutting tool which comprises a bit-holder fed at a prescribed feed amount f per revolution of the object to be ground; and a throw-away tip which is formed of a superhard metal, which has an outer peripheral surface of prescribed shape, an inner peripheral surface provided concentrically with the outer peripheral surface, similar to the prescribed shape of the outer peripheral surface and defining a hollow part and a predetermined thickness t and which is detachably mounted to the bit-holder, wherein a distance $\omega$ between the inner peripheral surface of the throw-away tip and the outer peripheral surface thereof is defined within a range satisfying the relation formula represented by:

$$f_{max} \leqq \omega \leqq t.$$

BRIEF DESCRIPTION OF THE DRAWINGS

FIG. 11 is a sectional view showing a second embodiment of mounting means of the tip to a tip holder;

FIG. 12 is a sectional view showing one modification of the second embodiment;

FIGS. 13A through 13E are plan views showing first through fifth modifications having different tips and inserts in shape, respectively;

FIGS. 20 through 22 are plan views respectively showing sixth through eighth modifications;

FIGS. 23 and 24 are perspective and sectional views respectively showing a ninth modification;

FIGS. 25 and 26 are perspective and plan views respectively showing a tenth modification;

DETAILED DESCRIPTION OF THE PREFERRED EMBODIMENTS

Figure 1A:
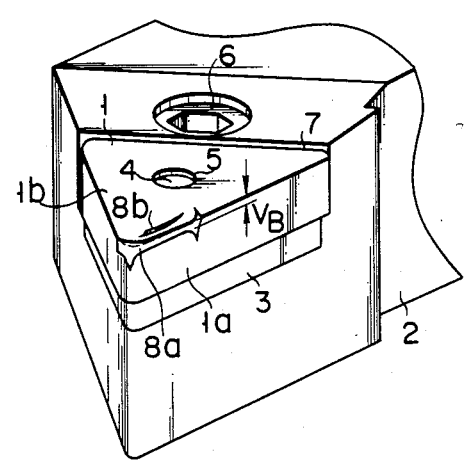
FIG. 1A is a perspective view showing the conventional cutting tool.
Figure 1B:
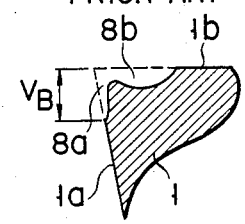
FIG. 1B is a sectional view showing in an enlargement the end of the conventional tip.

A first preferred embodiment of a cutting tool according to the present invention will be described in detail with respect to the case of the application to a lathe with reference to FIGS. 4 through 10 of accompanying drawings.

In the figures, reference numeral 12 designates a throw-away tip for turning, schematically formed in a hollow triangular pillar shape and formed of superhard metallic material, e.g., tungsten, cobalt, etc. This throw-away tip 12 has a cavity 13 passing through a thickness-wise direction. The outer periphery of the cavity 13 is defined by the three inner lateral surfaces of the throw-away tip 12, and is set similarly to the three outer lateral surfaces for defining the outer periphery of the throw-away tip 12. Distances or tip widths ($\omega$) between the outer lateral surfaces and the corresponding inner lateral surfaces of the tip 12 are respectively equally set. The respective outer lateral surfaces of the throw-away tip 12 are formed parallel to the respective corresponding inner lateral surfaces.

An insert 14 is intimately inserted into the cavity 13. The outer periphery of the insert 14 is set correspondingly to the inner periphery of the cavity 13 with integral surface. The insert 14 has a mounting hole 15, to which a tip locking pin 4 mounted on a shim 3 of a bit-holder 2 is inserted, and perforated in a thickness-wise direction. Necessary portions of the cavity 13 of the tip 12, the insert 14, the mounting hole 15 and the tip locking pin 4 are chamfered so as to effectively and readily lock to the bit-holder 2 of the tip 12 and to improve the cutting and working properties of the tip 12. These portions may also be, in addition to the chamfer, rounded or tapered.

The width ($\omega$) of the tip to become the most advantageous feature of the present invention will be described in detail. It is first important to know in the bit tool on which a throw-away tip is mounted which part of the cutting edge 11 receives a stress at cutting time, what magnitude of the stress is applied up to which position of a rake face 1b cutting chips is contacted when the cutting is executed at a prescribed feed amount f of the bit tool. Accordingly, the cutting chip contacting length l of a workpiece to be cut in case that the workpiece is cut by a bit tool on which a throw-away tip is generally mounted will initially be described with reference to FIGS. 6 and 7.

Figure 6:
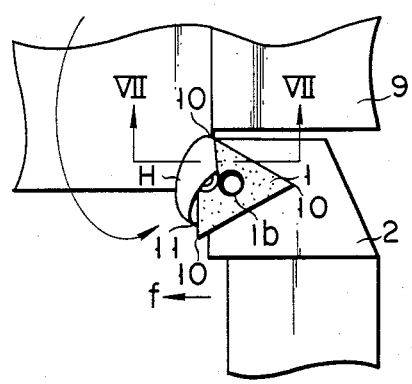
FIGS. 6 to 10 are views for explaining the dimensions of a cutting tool according to the present invention.
Figure 7:
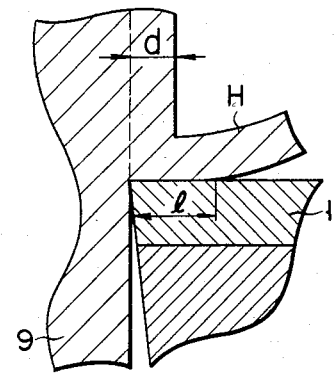

FIG. 6 is a view of a similar two-dimensional cutting state of a cutting tool. In FIG. 6, the state that a cylindrical workpiece 9 is, for example, being cut on the outer periphery thereof by a bit tool on which a triangular pillar-shaped throw-away tip 1 is mounted is shown. A side-cutting edge angle (not shown) is supposed to be zero, and a nose 10 is also, for the purpose of approximating to the two-dimensional cutting, set similar to zero. Reference numeral 11 illustrates a cutting edge. FIG. 7 is a sectional view taken along the line with arrows VII and VII in FIG. 6. The length of the fretted scar of the cutting chip H presented on the rake face 1b of the throw-away tip 1 after cutting is measured by a tool microscope under such cutting conditions. When the cutting chip contacting length l is obtained from the length of the fretted scar of the cutting chip H and a ratio l/d of the cutting chip contacting length l to the cutting length d is observed, it is identified to be approximately 3 to 5. Particularly when cutting oil is employed, the ratio l/d is resulted in 2.7. In FIGS. 7 through 10, the same reference numerals are designated to the components and parts equal in the components and parts and their functions to those shown in FIG. 6, and the description will be omitted.

Figure 8:
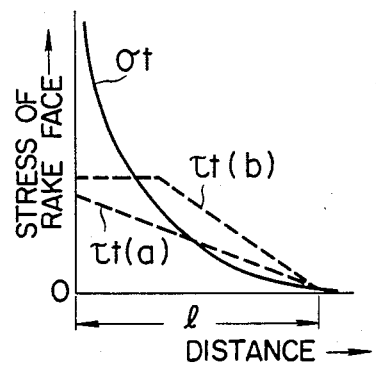

The stress on the rake face 1b of the throw-away tip will be described with reference to FIG. 8. FIG. 8 is a characteristic diagram in which the strengths of the stresses on the respective positions on the rake surface of the throw-away tip are measured, the stresses of the rake face 1b are plotted in an ordinate axis, and the distances from the cutting edge 11 are plotted in an abscissa axis. According to the characteristic diagram in FIG. 8, the magnitude of vertical stress ($\sigma_t$) acting vertically to the rake face 1b exponentially increases as it approaches the cutting edge 11, and disappears at the position (cutting chip contacting region boundary) isolated by the cutting chip contacting length l from the cutting edge 11. On the other hand, frictional stress ($\tau_t$) acting horizontally to the rake face 1b exhibits a triangular distribution ($\tau_{t(a)}$) or a trapezoidal distribution ($\tau_{t(b)}$), and disappears at the position (cutting chip contacting region boundary) isolated by the cutting chip contacting length l from the cutting edge 11.

Figure 9:
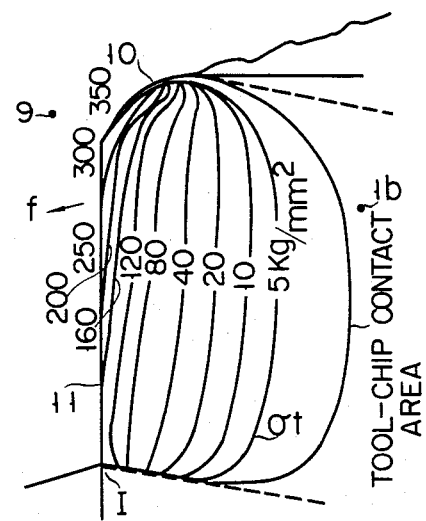

The cutting tool of three-dimensional cutting will be described with reference to FIG. 9. FIG. 9 is a characteristic diagram of vertical stress ($\sigma_t$) with respect to the rake face in three-dimensional cutting state. In FIG. 9, the vertical stresses ($\sigma_t$) acting to the various position on the rake face 1b in the three-dimensional cutting are actually measured, and are exhibited with equivalent stress lines, thereby depicting the distribution state. According to the characteristic diagram in FIG. 9, the vertical stress ($\sigma_t$) abruptly increases as it approaches from the position (cutting chip contacting region boundary) isolated by the cutting chip contacting length l from the cutting edge 11 of the rake face 1b to the cutting edge 11, and increases as it approaches from the cutting end I of the cutting edge 11 to the nose 10. The wear of the rake face 1b of the throw-away tip occurs due to the friction of the cutting chip H on the rake face 1b, and the region where the friction occurs is in the range of the cutting chip contacting length l from the cutting edge 11.

Figure 10:
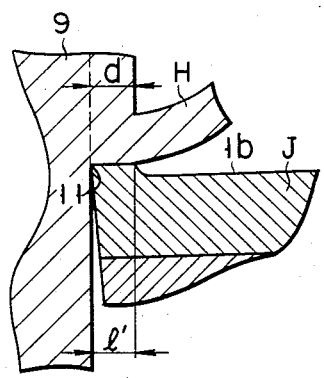

A cutting work with a cutting tool for limiting the cutting chip contacting length l will be then described with reference to FIG. 10. FIG. 10 is a schematic sectional view of a concept of cutting work with a cutting chip contacting area constraint tool for limiting the cutting chip contacting length l to l' (l' < l). In FIG. 10, the edge part of the cutting chip contacting area constraint tool J is formed thicker than the other part to the position isolated by the distance l' from the cutting edge 11, and has such features that the cutting resistance F of this type is decreased as compared with that of an ordinary bit tool with the cutting chip contacting length l, the wear of the tool and particularly of the rake face 1b is reduced, and the lifetime of the edge part is prolonged.

The foregoing description can be summarized as below.

(1) The cutting chip contacting length l on the rake face 1b is substantially with five times of the cutting thickness d.

(2) The vertical stress ($\sigma_t$) acting to the various positions on the rake face 1b exponentially increases as it approaches to the cutting edge 11, and increases from the cutting end I to the nose 10 in the edgewise direction of the cutting edge 11.

(3) The wear of the rake face of the tip normally occurs within the range of the cutting chip contacting length l.

(4) That main component of the cutting resistance which is acting in the thicknesswise direction of the tip is generally prominent.

(5) The cutting resistance of the contacting area constraint tool for limiting the cutting chip contacting length artificially decreases, and the wear of the rake face of the tool is less and the lifetime of the tool results in extension.

The following results are obtained according to the experiments executed on the basis of the aforementioned facts. That is, it is identified that, when the width ($\omega$) of the tip is set longer than the maximum value (fmax) of the optimum or most frequently used feed amount for the tip, the tip will less break in an ordinary light cutting, and the thickness of the tip is more important. As the width ($\omega$) of the tip is increased, the tip approaches the conventional tip, and hence consumes expensive and rare mineral resources. In the cutting tool of the present invention, the feature resides in the positive omission of the part not directly contributing the actual cutting as a hollow part, and the upper limit of the value of the width ($\omega$) of the tip is 5fmax (where fmax represents the maximum value of the extent of the feed amount of the tip per one revolution of a workpiece in case of three-dimensional cutting), as the length of the limit in which the cutting chip actually contacts with the rake face of the tip, or the thickness (t) of the tip, as selected either larger one. Since the thickness (t) of the tip is generally larger than the 5fmax, the width ($\omega$) of the tip is selected in the range of fmax$<\omega\leq$t as a whole. The following conditions are adapted for the using conditions of the tip.

That is, in an ordinary light cutting, the width ($\omega$) of the tip is less than the five times of the maximum value (fmax) of the feed amount, therefore the cutting chip contacting length (l) is in this case artificially limited to (l'). Thus, the cutting chip contacting area constraint tool for limiting the cutting chip contacting length to (l') is used to perform the cutting work. In a heavy cutting or in a hard cutting work, the width ($\omega$) of the tip is less than the thickness (t) of the tip. In case that the width ($\omega$) of the tip is set to the same as or to the vicinity of the thickness (t) of the tip, the tip is lightly saved in the resources as compared with the conventional tip, but the part which does not contribute to the actual cutting exists in the amount corresponding to the difference (t−5fmax) between the tip of the present invention and the conventional tip. In addition, in case of heavy or hard cutting work, the strength of the tip and particularly the feeding component of force and the back component of force are improved in strength, thereby prolonging the lifetime of the tip according to the present invention.

The sequence of determining the width ($\omega$) of the throw-away tip of the present invention will be concretely described. For instance, in case of a tip of square shape having 19.05 mm of one side, 6.35 mm of thickness (t), 1.6 mm of nose R, 5 mm of cutting depth, and material of a workpiece to be cut made of medium carbon steel (having 60 kgf/mm$^2$ of tensile strength), its optimum feed is 0.4 to 0.8 (mm/revolution). In this manner, the value of the width ($\omega$) of the tip can be determined in an ordinary case by fmax$\leq\omega\leq$5fmax and accordingly 0.8$\leq\omega\leq$4.0, and can be determined in worse cutting condition, e.g., intermittent cutting or the like by 5fmax$\leq\omega\leq$t and accordingly 4.0$\leq\omega\leq$6.35. Examples of numerals determined in this manner will be listed in the following Tables 1 and 2.

TABLE 1

| Size of tip | | | Range of feed f | (Dimension: mm) For light cutting | |
|---|---|---|---|---|---|
| Thickness (t) | Overall length | Nose R | (mm/rotation) | Range of width $\omega$ fmax $\leq \omega \leq$ 5 fmax | Determined value of width $\omega$ |
| 3.18 | 9.525 | 0.8 | 0.2–0.5 | 0.5 $\leq \omega \leq$ 2.5 | 2.0 |
| 4.76 | 12.70 | 1.2 | 0.3–0.6 | 0.6 $\leq \omega \leq$ 3.0 | 3.0 |
| 6.35 | 19.05 | 1.6 | 0.4–0.8 | 0.8 $\leq \omega \leq$ 4.0 | 4.0 |
| 7.94 | 25.4 | 2.4 | 0.6–1.2 | 1.2 $\leq \omega \leq$ 6.0 | 5.0 |

TABLE 2

| Size of tip | | | Range of feed f | (Dimension: mm) For heavy cutting | |
|---|---|---|---|---|---|
| Thickness (t) | Overall length | Nose R | (mm/rotation) | Range of width $\omega$ 5 fmax $\leq \omega \leq$ t | Determined value of width $\omega$ |
| 3.18 | 9.525 | 0.8 | 0.2–0.5 | 2.5 $\leq \omega \leq$ 3.18 | 3.0 |
| 4.76 | 12.70 | 1.2 | 0.3–0.6 | 3.0 $\leq \omega \leq$ 4.76 | 4.0 |
| 6.35 | 19.05 | 1.6 | 0.4–0.8 | 4.0 $\leq \omega \leq$ 6.35 | 5.0 |
| 7.94 | 25.4 | 2.4 | 0.6–1.2 | 6.0 $\leq \omega \leq$ 7.94 | 7.0 |

When the throw-away tip 12 thus constructed is mounted on the bit-holder 2, the insert 14 is first inserted into the cavity 13 of the tip 12 integrally. Thereafter, the tip locking pin 4 is then inserted into the mounting hole 15 of the insert 14. In this state, the clamping screw 6 is turned in the pushing direction, the pin 4 is thus inclined in the direction toward the wall surface 7 of the tip seat side, the insert 14 and the tip 12 thus engaged with the insert 14 are urged under pressure to the wall surface 7 of the tip seat side, and the tip 12 is thus locked to the bit-holder 2.

In the tip thus constructed according to the first embodiment of the present invention as described above, the cavity 13 is so formed as to be approximate or similar to the shape of the outer periphery of the tip 12 and respectively equal to the distances from the outer lateral surfaces to the corresponding inner lateral surfaces by considering the wearing shape and the cutting resistance of the tip. Therefore, the size of the cavity 13 becomes much larger than the conventional mounting hole 5, and the tip 12 can be formed with less material than the conventional tip without deteriorating the strength and the cutting performance. Thus, the quantity of material used, e.g., expensive tungsten, cobalt or the like is decreased in the tip 12, thereby contriving the resource-saving, and providing inexpensive cutting tool less than the conventional tool.

Furthermore, the insert 14 is formed in the state that the contour is approximate or similar to the shape of the cavity 13 of the throw-away tip 12, has the mounting hole 15 to which the tip locking pin 4 is inserted, and is intimately inserted into the cavity 13, and both tip 12 and insert 14 are locked to the bit-holder 2. Therefore, the following advantages and effects can be obtained:

(a) The tip 12 can be mounted at the conventional bit-holder 2 by employing the insert 14, and an interchangeability between the tip 12 of the present invention and the conventional tip can be provided.

(b) Since the insert 14 does not contribute directly to the cutting action nor wear, it can be formed of inexpensive material, and can also be used repetitively.

The present invention is not limited to the particular first embodiment described above. Various other changes and modifications may be made within the spirit and scope of the present invention. Other preferred embodiments of the present invention will be described in detail. In the following description, the components and parts similar or equivalent to those in the first embodiment will be denoted by the like reference numerals and will be omitted for the convenience of the description.

A second preferred embodiment will now be described with reference to FIG. 11.

When the throw-away tip 12 as described above is locked to the bit-holder 2, the insert 14 to be engaged with the cavity 13 of the tip 12 may be employed as in the first embodiment. On the other hand, as shown as the second embodiment in FIG. 11, an insert 22 for pressing and locking the tip 12 to the shim 3 of the bit-holder 2 may be used. This insert 22 has the first part 20a intimately inserted into the cavity 13 and the second flanged part 20b formed integrally with the first part 20a, projected radially outwardly from the first part 20a and having a lower surface engaged with the upper surface of the tip 12. A chip breaker plate 21 is fixedly provided on the outer periphery of the second part 20b. A through hole to which a screw 23 is inserted is formed at the center of the insert 22. The outer periphery of the chip breaker plate 21 is reduced inwardly at a prescribed distance from the outer periphery of the tip 12 to define the chip breaker. The insert 22 and the tip 12 are locked via the screw 23 to the bit-holder 2.

And, as shown as a first modification in FIG. 12, it may also be possible to fix the tip 12 on the bit-holder 2 without using the insert 14. That is, the shim 3 is attached to the bit-holder 2 by means of a first screw 16a. The tip 12 is set on the one end of a pressure member 17 by means of a second screw 16b. In the other end of the pressure member 17 is provided a first serration part 18a. A second serration part 18b corresponding to the first serration part 18a is provided on the upper surface of the bit-holder 2. The pressure member 17 has a loose through hole 17a. The tip 12 is fixed on the shim 3 by the pressure member 17 which is fixed to the bit-holder 2 by means of a third screw 16c through the loose through hole 17a under the condition of pressuring the tip 12 onto the shim 3. The position of the chip breaker plate 21 is defined by the engaging the first serration part 18a with the second serration part 18b.

A variety of modifications may be prepared as will be described below according to the present invention.

(a) As shown by first through fifth modifications in FIGS. 13A through 13E, respectively, the planar shape of the tips 24a through 24e may be formed in rhombic, parallelogrammic, ship-like, elliptical, or circular shape respectively having cavities 25a through 25e of the similar shape. Inserts 26a through 26e are respectively inserted correspondingly to the cavities 25a through 25e.

(b) The foregoing description is directed in the first embodiment to the preferred embodiment of the throw-away tip for a lathe, but the throw-away tip used for cutting tools of all types and shapes e.g., milling, balling, drilling, etc. may be applied with the throw-away tip and the insert according to the present invention.

The foregoing description is also directed in the second embodiment to another preferred embodiment of the throw-away tip in which the chip breaker is defined by the chip breaker plate fixedly provided on the outer periphery of the insert. However, the above throw-away tip is not limited to the particular construction described above, but may be constructed as a third preferred embodiment shown in FIGS. 14 and 15 within the spirit and scope of the present invention.

Figure 2:
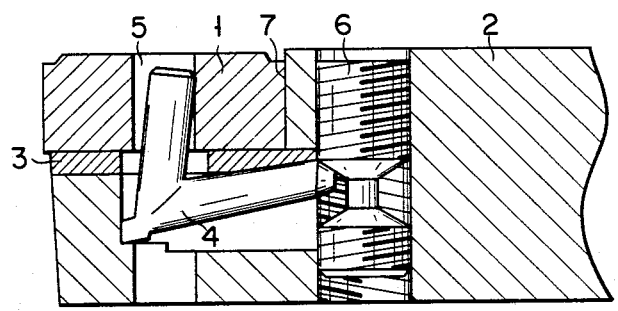
FIG. 2 is a sectional view showing the cutting tool shown in FIG. 1.
Figure 3:
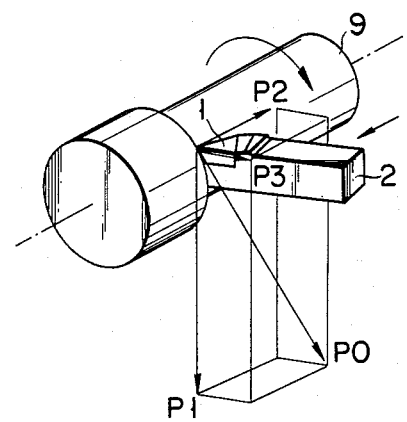
FIG. 3 is a perspective view for showing a cutting theory.
Figure 4:
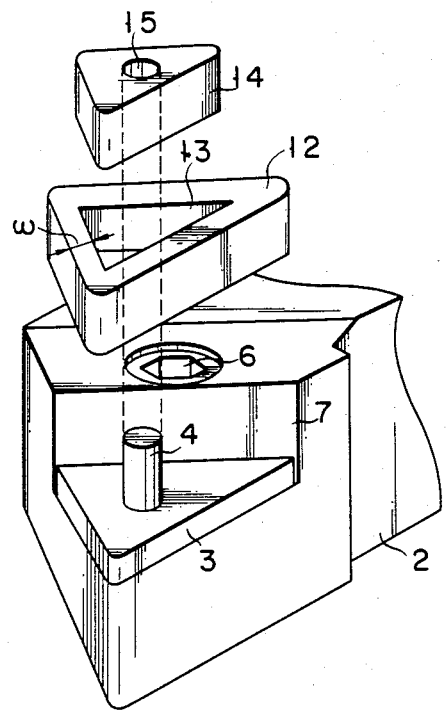
FIG. 4 is an exploded perspective view showing a first embodiment of the cutting tool according to the present invention.
Figure 5:
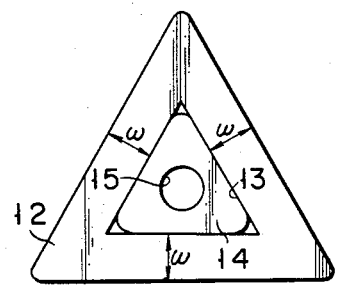
FIG. 5 is a plan view showing the throw-away tip used for the cutting tool shown in FIG. 4 together with an insert.
Figure 14:
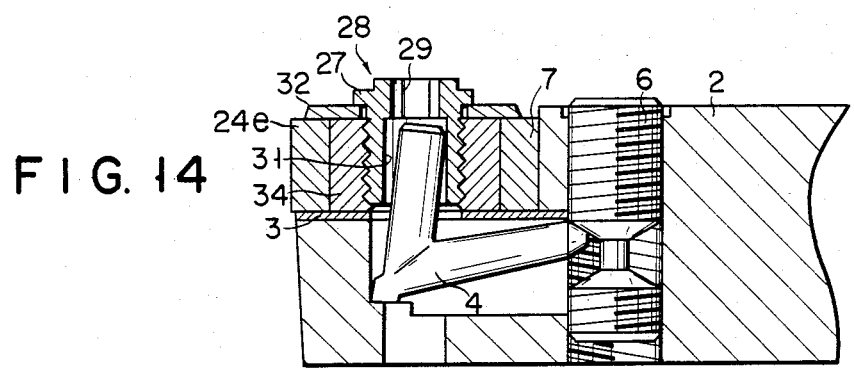
FIGS. 14 and 15 are sectional and exploded perspective views respectively showing a third embodiment of a cutting tool according to the present invention.
Figure 15:
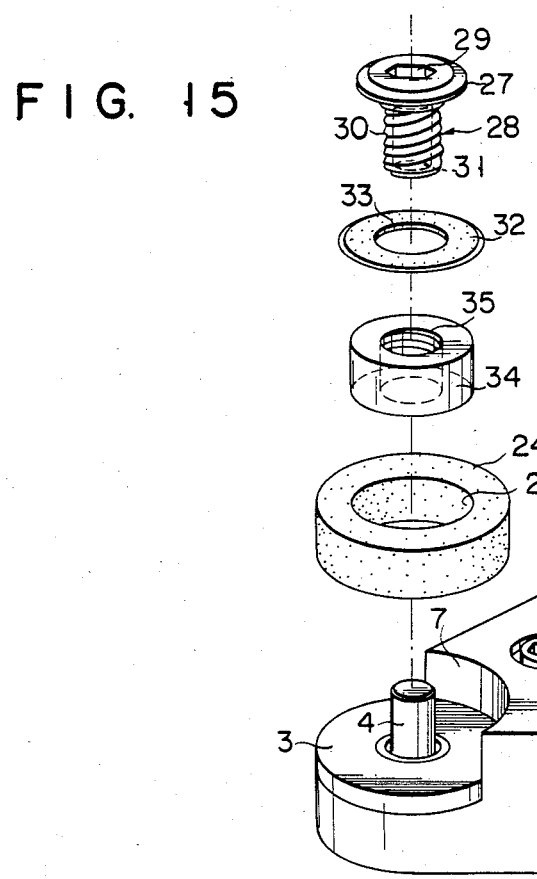

In FIGS. 14 and 15, a tap bolt 28 provided with a flange 27 has a hexagonal hole 29 at its head. This bolt 28 has a male threaded part 30 consecutive to the head. The bolt 28 has a hollow part 31 to which a pin 4 of the bit-holder 2 is inserted is formed at the center. A thin chip breaker plate 32 is separately provided on the upper surface of the insert 36. A through hole 33 to which the male threaded part 30 is loosely inserted is formed at the center of the chip breaker plate 32. The chip breaker plate 32 has an outer diameter necessary for the tip 24e to have a prescribed chip breaker. The bolt 28 is so threaded at the male threaded part 30 with the female threaded part 35 formed on the inner periphery of an insert 34 that the chip breaker plate 32 is interposed between the head of the bolt 28 and the insert 34 and they are integrally fixed. The insert 34 thus integrally provided with the chip breaker plate 32 is intimately inserted into the cavity 25e of the tip 24e. In this state, a predetermined chip breaker is formed via the chip breaker plate 32 on the upper surface of the tip 24e. When the clamping screw 6 is turned to insert, the pin 4 is inclined toward the wall surface 7 at the tip seat side, the tip 24e is urged under pressure to the wall surface 7, and is locked to the bit-holder 2. The thickness of the insert 34 is so formed as not to be larger than the thickness of the tip 24e. Since the chip breaker plate 32 is, therefore, fixed onto the upper surface of the insert 34 and is also brought into contact with the upper surface of the tip 24e, the chip breaker plate can perform the function for breaking the cutting chip in the same manner as the chip breaker formed integrally with the conventional tip shown in FIG. 2.

According to the third preferred embodiment embodying the cutting tool of the present invention, the chip breaker is composed of the tip 24e and the chip breaker plate 32 formed integrally with the insert 34 via the bolt 28. Therefore, the cavity 25e may be formed larger than the conventional cavity.

Since the insert 34 and the flanged tap bolt 28 do not necessitate wear resistance and hardness as the tip 24e and the chip breaker plate 32, they may be formed of relatively inexpensive material. Further, the shape and the size of the chip breaker may be selected to be adapted for desired cutting conditions and the material of a workpiece to be cut. Since the conventional tip is provided integrally with the chip breaker, the tip should be thrown away when the tip itself can be used but its chip breaker is damaged not to be durable for use. However, only the chip breaker plate may be replaced in the third embodiment of the tip, which is thus economic. Furthermore, in case of cutting discontinuously a workpiece or cutting a workpiece having small ductility with preferable cutting chip treatment, the tip may be used without the chip breaker by removing the chip breaker plate from the tip.

When a larger cavity is formed in a tip which does not relate directly to cutting for the purpose of resource-saving and the like, it is difficult to so increase the cavity as to be due to the space in which the chip breaker is heretofore provided. However, in the third embodiment embodying the cutting tool of the present invention, since the chip breaker plate may function as a chip breaker when the end of the chip breaker plate reaches the upper surface of the tip, a cavity larger than the conventional cavity of the tip with the chip breaker may be formed within the tip, and greater resource-saving and less expensive tip may be provided. In addition, the conventional bit-holder to which a tip with a hole is applied may be used without any modification for the conventional bit-holder with a pin, an eccentric pin type bit-holder, etc. (not shown).

According to the aforementioned first through third embodiments embodying the cutting tool of the present invention, the outer peripheral surface of the insert is, as shown, consecutively formed. The present invention is not limited to these particular embodiments described above, but may also be composed as the fourth preferred embodiment shown in FIGS. 16 through 19.

An insert 36 of the tip of the fourth embodiment has a single slot 37 radially inwardly extending on the outer peripheral surface thereof. That is, the outer peripheral surface of the insert 36 is discontinuous at the slot 37. This slot 37 extends, in the fourth embodiment, to the mounting hole 15 and communicates with the mounting hole 15. However, the slot 37 may not extend to the mounting hole 15.

Figure 16:
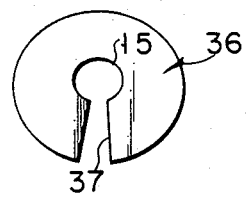
FIG. 16 is a plan view showing an insert removed and used in a fourth embodiment of the cutting tool according to the present invention.
Figure 17:
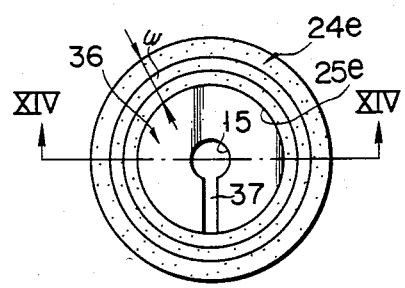
FIGS. 17 and 18 are plan and sectional views respectively showing the insert shown in FIG. 16 inserted into the throw-away tip.
Figure 18:
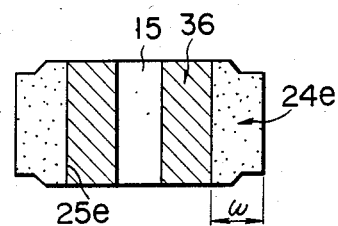
Figure 19:
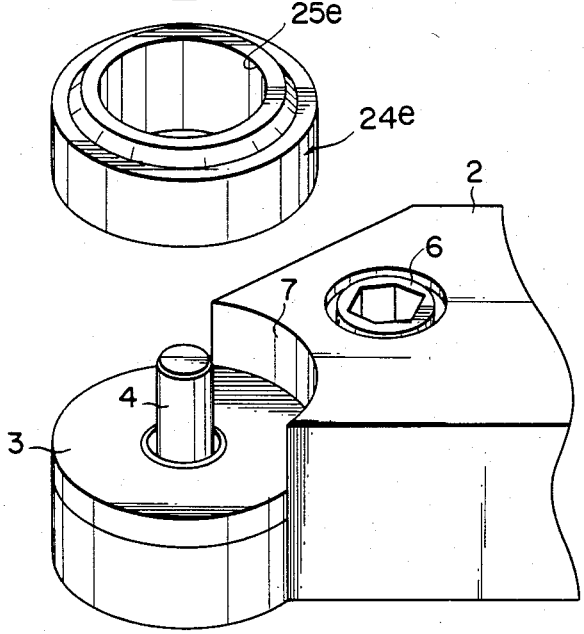
FIG. 19 is an exploded perspective view showing a fourth embodiment.

The operation of the insert 36 thus composed will be described in detail. FIGS. 17 and 18 show the state that the circular insert 36 with the slot 37 shown in FIG. 16 is inserted into the cavity 25e of the cylindrical hollow throw-away tip 24e. In FIG. 16, the insert 36 slightly opened due to the slot 37 is restricted by the inner wall of the cavity 25e of the throw-away tip 24e, and is engaged with the tip 24e in thus compressed state. Therefore, the insert 36 will produce a recoiling force tending to return to the original shape, with the result that the outer peripheral surface of the insert except the slot 37 is intimately contacted with the inner wall of the cavity 25e of the throw-away tip 24e.

When the pin 4 of the bit-holder is inclined upon turning of the clamping screw 7 in the state that the insert 36 is thus intimately contacted with the tip 24e, the pin 4 tends to expand the slot 37 of the insert 36 in the tip 24e. Therefore, the insert 36 is strongly contacted with the inner wall of the throw-away tip 24e. Accordingly, the tip of this embodiment can be used in stable state even against the fluctuated vibration caused by the variation of the cutting resistance or the like, thereby improving the lifetime of the cutting tool.

On the other hand, since cutting heat generally occurs during the cutting work to cause the tip to become extremely high temperature, the tip is thermally damaged, is resultantly fastened in wear and is thus shortened in its lifetime. When the insert in the fourth embodiment of the present invention is used, since the slot is formed on the outer peripheral surface of the insert, the surface area exposed and contacted with the atmospheric air is increased as compared with the insert in which such a slot is not formed. In this manner, the dissipating and cooling effect of the cutting heat of the tip can be improved, the thermal damage of the tip can be thus suppressed, and the lifetime of the throw-away tip can be accordingly improved. Since the part of the increased volume of the inserted due to the thermal expansion is further absorbed and alleviated by the slot space formed at the insert, the damage of the throw-away tip due to the thermal expansion of the insert can be eliminated. Furthermore, inasmuch as the insert itself does not contribute directly to cutting work, it may be repetitively used and is consequently economic.

The foregoing description is directed to the example of the cylindrical hollow throw-away tip 24e in which the insert is inserted, but this embodiment may also employ the throw-away tip of the shape other than the cylindrical hollow shape within the spirit and scope of the present invention.

FIG. 20 shows a sixth modification of the fourth embodiment of the insert of the throw-away tip in the state that a triangular pillar-shaped insert 38 provided with a slot 40 is inserted into the cavity 13 of the hollow triangular pillar-shaped throw-away tip 12.

FIG. 21 shows a seventh modification of the fourth embodiment of the insert of the throw-away tip in the state that a square pillar-shaped insert 43 provided with a slot 42 is inserted into the cavity 41 of a hollow square pillar-shaped throw-away tip 40. In these two modifications, the slots 40 and 42 are opened at the respective outer lateral surfaces of the pillar-shaped inserts. However, as shown as an eighth modification in FIG. 22, the slot 40 of the insert 38 may be opened at the corner of the pillar-shaped insert.

In a ninth modification of the insert in FIG. 23, the slot 40 is formed on the outer periphery of a tapered insert 45 having a tapered outer periphery 44.

FIG. 24 shows the state that the tapered insert 45 shown in FIG. 23 is inserted into a cylindrical hollow throw-away tip 47 having a tapered cavity 46. Since the outer periphery of the insert 45 and the inner surface of the cavity 46 are coupled in tapered state and the slot 40 formed at the insert 45 is restricted and compressed by the inner surface of the cavity 46 of the throw-away tip 47, both are further intimately engaged with one another.

Figure 26:
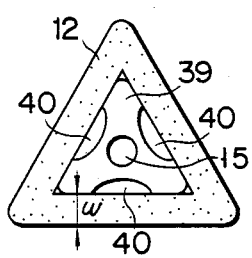

In the sixth through ninth modifications, the single slot is formed at each insert and is formed in the state communicated with the mounting hole 15. However, the present invention may not be limited to these particular structures described above, but as shown as a tenth modification in FIG. 25, a plurality of slots 40, three in this particular example, may be formed, and may not always be communicated with the mounting hole 15. FIG. 26 shows the state that the insert 39 shown in FIG. 25 is inserted into the throw-away tip 12 of hollow triangular pillar-shape.

Figure 27:
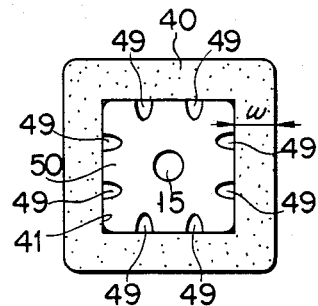
FIGS. 27 through 29 are plan views respectively showing eleventh through thirteenth modifications.

FIG. 27 shows as an eleventh modification of the insert in the state that a square pillar-shaped insert 50 having a plurality of slots 49 is inserted into the cavity 41 of the hollow square pillar-shaped tip 40.

Figure 28:
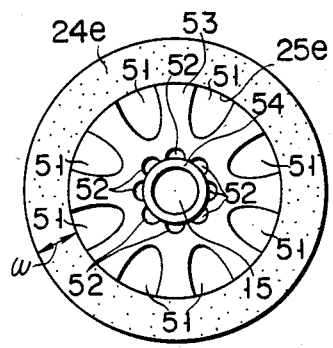

FIG. 28 shows as a twelfth modification of the insert in the state that a circular insert 52 having a plurality of slots 51, 52 on the inner and the outer peripheral surfaces respectively is inserted into the cavity 25e of a hollow circular pillar-shaped throw-away tip 24e. A second insert 54 is inserted into the mounting hole 15 of the insert 53. In this case, the material of the second insert 54 may be different from the insert 53 with slots. For instance, only the second insert 54 making direct contact with the pin 4 of the bit-holder 2 may be formed of a material having high wear resistance. When the slots are formed also at the inner peripheral surface of the insert, the effect of the slots formed at the outer peripheral surface thereof can be enhanced.

Figure 29:
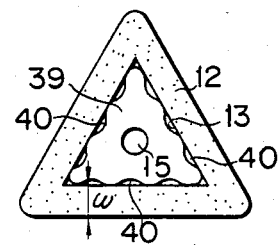

FIG. 29 shows as a thirteenth modification of the insert in the state that a generally triangular pillar-shaped insert 39 formed with a slot 40 having a wavy shape is inserted into the cavity 13 of the hollow triangular pillar-shaped throw-away tip 12.

The foregoing description is directed to the modifications of the insert in which the shape of the mounting hole is circular, but may also be polygonal or tapered.

According to the fourth embodiment and the sixth through thirteenth modifications thereof, at least one slot is formed at the insert of the throw-away tip and hence have the following advantages and effects.

(a) Since the slot is formed at the insert and are incorporated with relatively elastic property, the insert is compressed by the inner wall of the cavity of the throw-away tip to thus cause a recoiling force. Inasmuch as the insert is thus intimately engaged with the throw-away tip, the throw-away tip can be rigidly mounted at the bit-holder via the insert, and can accordingly be used stably against the vibration of the tool during cutting work, the lifetime of the cutting tool can be prolonged, and the cutting tool can be thus used under excellent cutting conditions.

(b) Since the pin tends to push and expand the width of the slot formed at the insert when the throw-away tip is mounted via the pin at the bit-holder, the throw-away tip can be more rigidly engaged with the insert, thereby further improving the stability of the cutting tool during cutting work.

(c) Since the surface area of the insert is increased due to the formation of the slot at the insert, its heat dissipating and cooling effects with the atmospheric air are improved, and the decrease in the lifetime of the throw-away tip due to the thermal damage can be effective prevented.

(d) Since the part of the increased volume of the insert due to the thermal expansion of the cutting heat can be partly absorbed by the slot formed at the insert, the damage of the throw-away tip can be effectively eliminated.

(e) Since the insert itself does not contribute directly to the cutting work, it is not damaged, but can be repetitively used extremely economically.

Figure 30A:
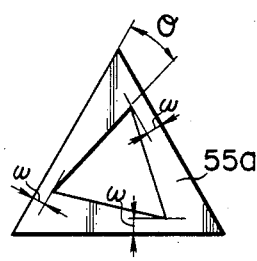
FIGS. 30A and 30B are plan views respectively showing a fifth embodiment of the cutting tool according to the present invention.
Figure 30B:
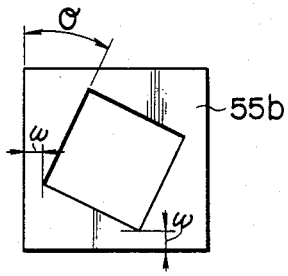

The foregoing description as to the first embodiment of the throw-away tip according to the present invention is directed to that the outer lateral surface of the throw-away tip 12 is formed parallel to the inner lateral surface thereof. However, as exemplified by a fifth embodiment and a fourteenth modification thereof respectively in FIGS. 30A and 30B, each outer lateral surface of the throw-away tip 55a and 55b may be inclined at the prescribed angle $\theta$ with respect to each inner lateral surfaces thereof, respectively. In this embodiment, the distance ($\omega$) between the outer lateral surface and the corresponding inner lateral surface is defined by the shortest distance therebetween. The width of the part which actually contributes to the cutting can be increased by providing the inclination, and thereby remedying against the variation in the cutting margin thereof. Furthermore, the strength of the cutting edge of the cutting tool can be improved on the basis of the distribution of the actual vertical stress.

Figures 31, 32A, 32B, 32C:
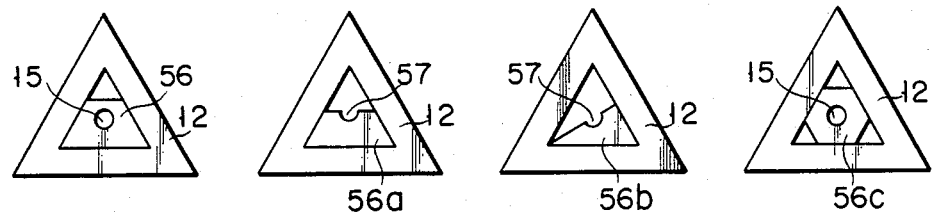
FIG. 31 is a plan view showing a sixth embodiment of the cutting tool according to the present invention.
FIGS. 32A through 32J are plan views respectively showing fifteenth through twenty-fourth modifications.
Figures 32D, 32E, 32F:
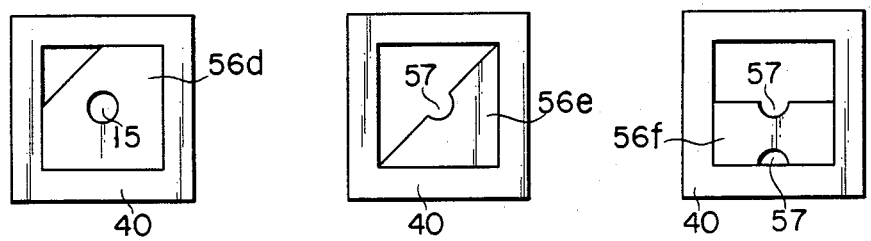
Figures 32G, 32H, 32I, 32J:
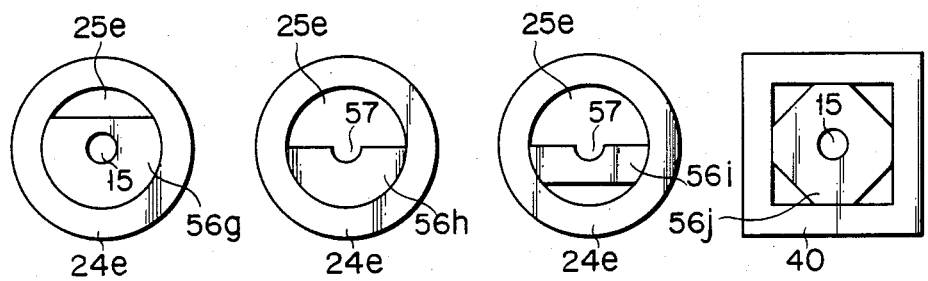

The foregoing description as to the first embodiment of the throw-away tip according to the present invention is directed to that the outer periphery of the insert 14 is set correspondingly to the inner periphery of the throw-away tip 12 for defining the cavity 13. However, the outer periphery of the insert 56 may be, as shown as a sixth embodiment in FIG. 31, composed of a first part facing to one part of the inner periphery of the throw-away tip 12 and a second part not facing to the other part of the inner periphery. In other words, the outer periphery or the insert 56 may be intimately contacted with the inner periphery of the throw-away tip 12 at the first part and may be isolated from the inner periphery at the second part. Because the insert 56 is actually functioned when the throw-away tip 12 is pushed to lock to the wall surface 7 at the tip seat side via the insert 56 by the inclination of the pin 4 inserted into the mounting hole 15. Therefore, the first part making contact with the inner peripheral surface of the throw-away tip 12 is necessary for the part confronting the wall surface 7 at the tip seat side, but the residual part is not necessary to be contacted with the inner peripheral surface of the throw-away tip 12. The mounting hole may not always be formed from the through hole, but be tormed from the slot 57 extending along the thicknesswise direction from the side face defining the second part as shown by a fifteenth modification in FIG. 32A.

FIGS. 32B through 32J show sixteenth through twenty-fourth modifications according to the present invention.

What is claimed is:

1. A cutting tool for operating on a rotating workpiece, said cutting tool during use being fed relative to said workpiece in a direction of an axis of rotation of said workpiece by a prescribed feed amount f per revolution of said workpiece, said cutting tool comprising:
a bit holder; and
a throw-away tip which is formed of superhard metal, which has an outer peripheral surface of prescribed shape, an inner peripheral surface provided concentrically with the outer peripheral surface and defining a hollow part and a predetermined thickness t which detachably mounted to the bit holder,
wherein a distance w between the inner peripheral surface of said throw-away tip and the outer peripheral surface thereof is defined within a range satisfying the following formula represented by:

$f_{max} \leq \omega \leq t,$ where $f_{max}$ is a maximum value for f.

2. The cutting tool according to claim 1, wherein said distance w is defined in a range satisfying the following formula in a light cutting mode:

$f_{max} \leq \omega \leq 5f.$

3. The cutting tool according to claim 1, wherein said distance w is defined in a range satisfying the following formula in a heavy cutting mode:

$5f_{max} \leq \omega \leq t.$

4. The cutting tool according to claim 1, which further comprises:

an insert having an outer periperal surface corresponding to the inner peripheral surface of said throw-away tip and inserted into the hollow part of said throw-away tip, said insert having a through hole passed through a thicknesswise direction for locking said throw-away tip to said bit-holder.

5. The cutting tool according to claim 4, which further comprises:

a chip breaker plate provided on the upper surface of said throw-away tip for defining a chip breaker.

6. The cutting tool according to claim 5, wherein said insert has a projection projected upwardly from the upper surface of said throw-away tip; and said chip breaker plate is fixed to the outer peripheral surface of said projection.

7. The cutting tool according to claim 5, wherein a female threads are spirally formed on the through hole of said insert, and said chip breaker plate is locked via a bolt screwed into the through hole onto the upper surface of said throw-away tip.

8. The cutting tool according to claim 4, wherein said insert has a single slot extendng in a thicknesswise direction on the outer peripheral surface thereof.

9. The cutting tool according to claim 8, wherein said slot extends to communicate with said through hole of said insert.

10. The cutting tool according to claim 4, wherein said insert has a plurality of slots extending in thicknesswise direction on the outer peripheral surface thereof.

11. The cutting tool according to claim 10, wherein said insert has a plurality of slots extending in a thicknesswise direction on the inner peripheral surface thereof.

12. The cutting tool according to claim 1, wherein said outer peripheral surface includes a prescribed number of side faces, and said inner peripheral surface includes a plurality of side faces in the same number as the prescribed number.

13. The cutting tool according to claim 12, wherein the respective side faces of said outer peripheral surface are formed parallel to the corresponding side faces of the inner peripheral surface.

14. The cutting tool according to claim 12, wherein the respective side faces of said outer peripheral surface are inclined at a predetermined angle with respect to the corresponding side faces of the inner peripheral surface.

15. The cutting tool according to claim 1, which further comprises:

an insert having at least one outer peripheral surface corresponding to one part of said inner peripheral surface and inserted into the hollow part of said throw-away tip.

16. The cutting tool according to claim 15, wherein said insert has a through hole passed through the thicknesswise direction thereof for locking said throw-away tip to said bit-holder.

17. The cutting tool accordingto claim 15, wherein said insert has a side face not corresponding to the other part of the inner peripheral surface of said throw-away tip, and the side face has a slot which extends in the thicknesswise direction for locking said throw-away tip to said bit-holder.

18. The cutting tool according to claim 1, which further comprises:

a pressure member one end of which is fixed to the bit-holder and the other end of which urges the throw-away tip toward the bit-holder to lock said throw-away tip to said bit-holder.

* * * * *